UNITED STATES PATENT OFFICE.

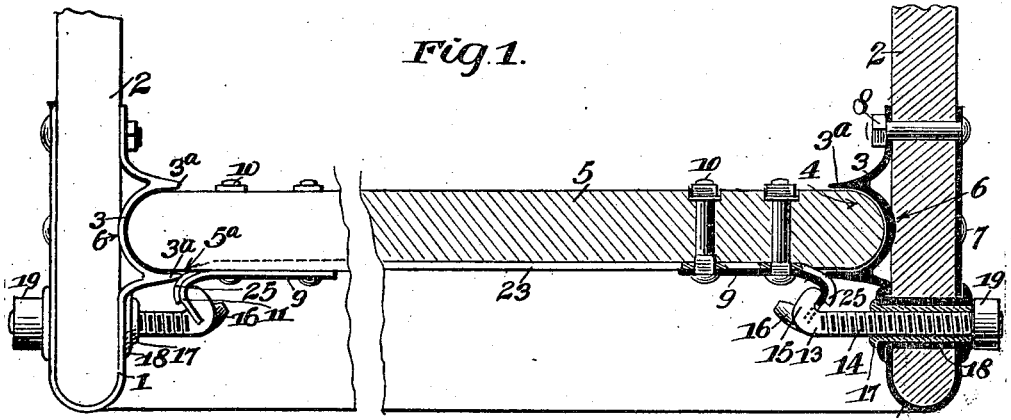
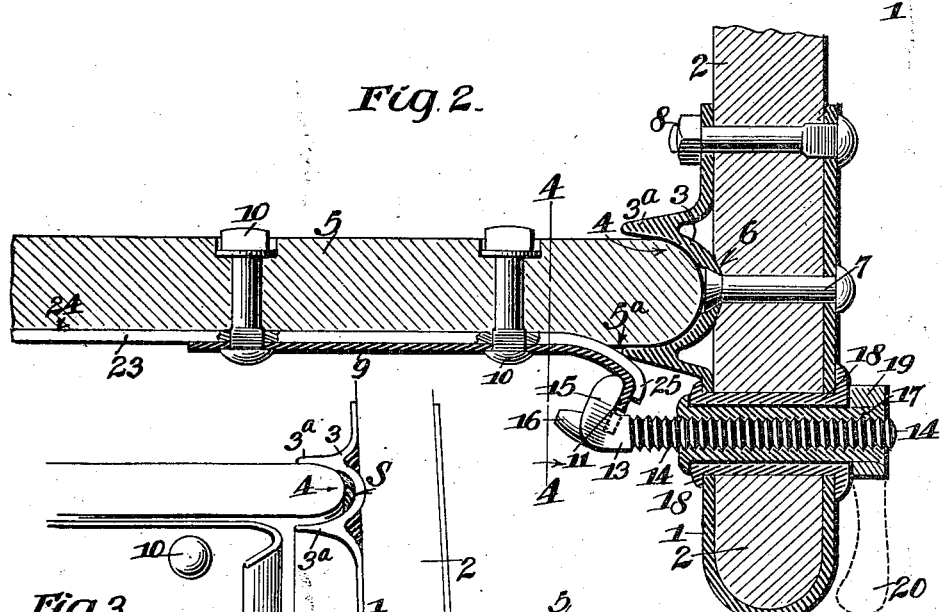
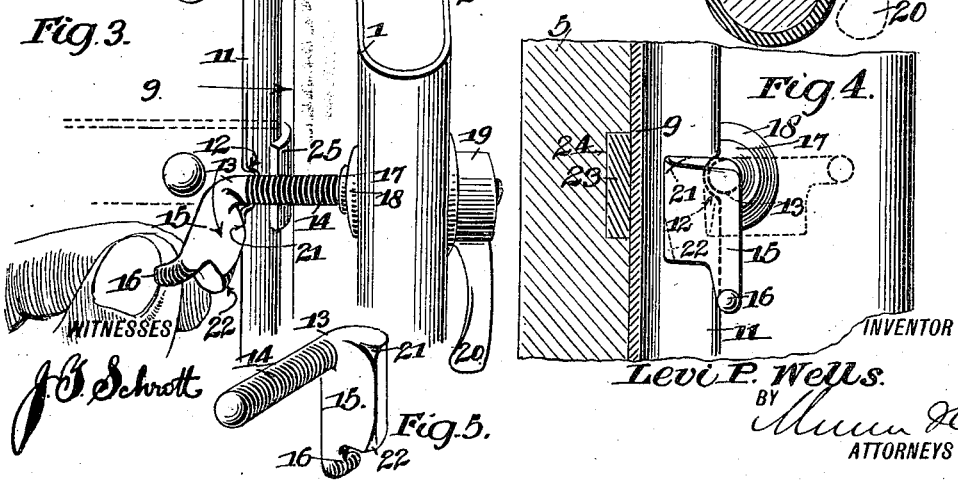
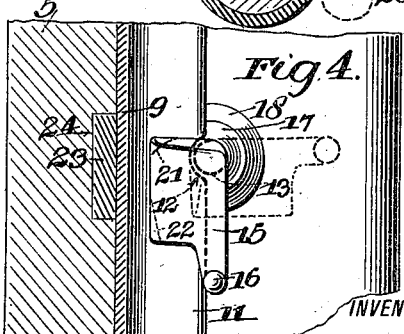
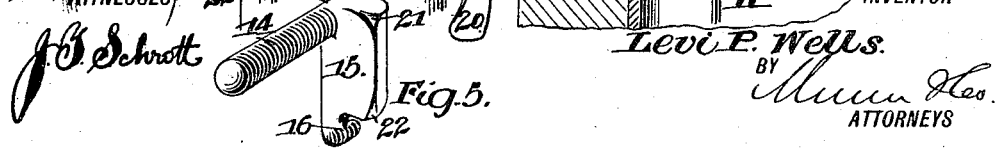

LEVI P. WELLS, OF GERING, NEBRASKA.

END-GATE FASTENER.

1,275,338.　　　Specification of Letters Patent.　　Patented Aug. 13, 1918.

Application filed December 22, 1917. Serial No. 208,459.

*To all whom it may concern:*

Be it known that I, LEVI P. WELLS, a citizen of the United States, and a resident of Gering, in the county of Scotts Bluff and State of Nebraska, have made certain new and useful Improvements in End-Gate Fasteners, of which the following is a specification.

My invention relates to improvements in end gate fasteners, and it consists in the constructions, combinations and arrangements herein described and claimed.

An object of my invention is to provide an end gate fastener including as one of the important features, a combined sheath for the ends of the sides of the wagon body and cleats receiving the ends of the end gate, together with means for clamping the end gate in position in said cleats.

Another object of the invention resides in so arranging said cleats and the clamping means, that the end gate may be held in various elevated positions as in unloading grain, without entirely removing the end gate.

Another object of the invention is to provide a combined end gate rod and brace cooperating with the clamping means to form a rigid structure when the end gate is fastened in position.

Other objects and advantages will appear in the following specification, reference being had to the accompanying drawing in which:

Figure 1 is a plan view of a portion of a wagon body with the end gate in place, and showing the improved fastener, parts being shown in section;

Fig. 2 is an enlarged section of a portion of the structure illustrated in Fig. 1;

Fig. 3 is a perspective view illustrating the clamping action of the clamp head on the coacting hook plate of the end gate;

Fig. 4 is a cross section on the line 4—4 of Fig. 2, and

Fig. 5 is a detail perspective view of the clamp screw.

In carrying out my invention I provide a combined sheath and end gate guide, which consists of the metallic plate 1, which is bound around the rear end of each of the sides 2 of the wagon body. This sheath may consist of bent metal or it may be cast into the shape shown. It may also be made of any material suitable for the purpose of incasing the end of the side 2, and prevent the breaking and scarring of the wood, which occurs in certain instances as will presently appear.

The cleat 3 which receives the adjacent rounded end 4 of the end gate 5, is formed integrally with the sheath 1, as shown. The so-called cleat 3 consists of a semi-circular seat or guide. The rounded ends of the end gate are slid into the companion semi-circular cleats from the top, as will be readily understood from the drawing. The side 2 is provided with a shallow groove or vertical depression 6 in which the rounded portion of the cleat 3 rests. This arrangement is clearly shown in Fig. 2, where it will also be seen a rivet 7 passes through said rounded portion and the head of the rivet is upset on the outside. The cleat 3 is thus firmly held in position. The ends of the sheath 1 are fastened to the side 2 by a bolt or bolts 8.

A hook plate 9 is secured adjacent to each end of the end gate 5, by bolts 10. The hook plate 9 is bent into the shape shown to form a hook 11. The hook 11 has a semi-circular recess 12 which is adapted to accommodate the shank 13 of the clamp screw 14 when the parts are in position, as indicated in Fig. 2.

The hook plate 9 together with the hook 11, forms a cleat or strengthening rib for the end gate 5. Ordinarily such devices as wooden cleats are employed to keep the end gate from warping. These cleats are nailed in place crosswise of the end gate. In my invention the metallic plate 9 takes the place of a cleat in the same location on the end gate. It will be observed that the curved hook 11 acts as a strengthening rib, reinforcing the plate 9 very much as would be the case were the hook plate 9 made of corrugated metal.

A head 15 is formed on the inner end of the clamp screw 14, and is of such a shape as to firmly engage the hook 11 of the plate 9 when presented thereto, to clamp the end gate in each cleat 3. The head 15 includes a lug 16 which may be grasped in the fingers in rotating the head 15 out of engagement with the hook 11.

The clamp screw 14 is rotatable in a relatively stationary nut 17, which in turn rotates in a thimble or bushing 18. The bushing 18 is situated in a transverse opening near the end of the side board 2, and is held in place by upsetting ends as clearly indicated in Fig. 2. The inner end of the stationary nut 17 is also upset so that the nut may be rotated in the bushing and still be prevented from moving out of the bushing.

A head 19 is firmly fixed on the end of the nut 17 which protrudes beyond the thimble 18. The head 19 may readily be made an integral part of the stationary nut 17. The drawing shows the head as being a separate member swaged in place by expanding the end of the nut in some suitable manner. This particular construction is subject to some variation and may be varied as required so long as the feature of the free turning of the nut in the bushing is preserved.

A handle 20 is carried by the head 19. This handle is of a peculiar shape in that the enlarged finger engaging portion is turned inwardly instead of being turned outwardly, as is often the case. The reason for turning the handle 20 inwardly is, to prevent the driver's clothing, or the bridles of the horses, etc., from catching beneath the handle with the consequent annoying results. The construction shown affords a practically continuous or smooth surface from the end of the clamp screw 14 down to the surface of the sheath 1. The advantages of this feature can be readily appreciated from Figs. 2 and 3.

The clamp head 15 is beveled at opposite inside edges at 21 and 22. One of the purposes of the beveled edges is illustrated in Fig. 3. Here the upper beveled edge 21 is shown in engagement with the edge of the hook 11. The beveled edge 21 has a cam-like action on the hook 11. There may be a situation where the clamp screw 14 and nut 17 are adjusted to a certain position which is just right for securely clamping the end gate 5 in the cleats 3. The edge of the hook 11 of course projects into a plane below the front edge of the clamp head 15, which it will be seen is disposed at substantially the same angle as is the end of the hook 11.

Now it will be apparent that when the end gate 5 is slid into the cleats 3 and rests loosely therein, as indicated by the space S in Fig. 3, the beveled edge 21 of the clamp head 15 being first presented to the edge of the hook 11 will, upon turning the head 15 in the direction indicated by the arrow exert a pressure on the hook 11, in the direction of the horizontal arrow, when the end gate will be made to firmly engage the semi-circular cleat 3. This action applies to the clamping devices at each end.

Before sliding the end gate 5 into position between the cleats, the clamp screws 14 are first screwed out of the way so that the heads of the clamp screws will not obstruct the passage of the hook 11 on the end gate. When the end gate rests loosely in the position above described, and as shown in Fig. 3, the clamp screws are again screwed inwardly, whereupon the heads 15 are turned out so that the shanks of the clamp screws may pass into the notches in the hooks until the heads 15 occupy the proper positions next to the inside of the hooks.

The beveled edge 22 facilitates the counter-rotation of the clamp head 15, from the locking position indicated in full lines in Fig. 4, to the unlocked position indicated by the dotted lines in the same figure. It will be evident that in counter-rotating the clamp head the lower inner edge of the head must ride over the edge of the hook 11. By beveling this edge as at 22, this counter-rotation is more easily performed.

A combined end gate rod and brace 23 extends from one side of the end gate 5 to the other. A recess 24 is provided in the end gate to receive the rod 23. The rod 23 may be secured on the surface of the end gate if it be so desired, but in this event the hook plate 9 must be formed with a pressed-out portion to accommodate the ends of the rod 23 which pass under the respective hook plates. Hooks 25 are formed on the ends of the rod 23.

Each hook 25 is of substantially the same shape as the adjacent part of the hook 11 so that the hook 25 may partly encompass the hook 11 and form a firm brace and support therefor. It will be observed that the extremity of the hook 25 passes over the highest portion or knee of the hook 11. By arranging the parts in this manner the two hooks are held together and the hook 11 is more effectively braced because the hook 25 is located just where the greatest strain on the hook 11 comes, namely, through the clamp head 15.

There is another feature to which attention is directed. It has been stated that each cleat 3 is semi-circular in formation. Each cleat however, includes horizontal portions $3^a$ which extend a sufficient distance that the outer one of the horizontal portions $3^a$ may be wedged into the recess $5^a$ formed between the adjacent surfaces of the end gate 5 and hook plate 9. This horizontal portion $3^a$ and the hook plate 9 thus interlock, as it were, securing additional rigidity between the end gate and the cleats, when the clamp heads are in the locking position.

The operation of the device is thought to be clearly understood, but a resumé thereof together with a brief description of the advantages of this particular construction may have its benefits. The end gate 5 is slid into position between the metallic cleats 3 from the top. The rounded ends of the end gate are unsheathed, that is to say, the bare wood engages the cleats. In this connection it may be stated that ordinarily where wooden cleats are employed, there is an invariable swelling or distortion of either the ends of the end gate or the cleats when the parts become wetted. It has also been found impossible to obtain a snug fitting of the end gate under such circumstances.

The use of the metallic cleats obviates all former difficulties with respect to the smooth and ready fitting of the end gate. The end gate may at first not fit exactly in place and there may be a slight space such as indicated at S in Fig. 3. Assuming that the relative adjustments of the nut 17 and clamp head 15 are about correct, the head 15 may be rotated in the direction of the curved arrow in Fig. 3 by pressing on the lug 16, when the upper bevel 21 will ride upon the edge of the hook 11 and exert a pressure on the hook. The adjacent end of the end gate 5 will thus be driven firmly into place in the cleat 3, taking up the space S. Should there now be any remaining looseness between the clamp head 15 and the hook 11, the handle 20 may be given a turn, thus causing the head 15 to tightly bind on the hook 11 and firmly clamp the end gate in position.

The action of the stationary nut 17 on the clamp screw 14 will be readily understood. The stationary nut 17 is stationary only with respect to the clamp screw 14, but is free to rotate in the thimble or bushing 18 as will be readily understood from Fig. 2. The principal advantage of shaping the handle 20 so that there is no protruding part, is that the possibility of catching the clothing or catching the bridles of the horses beneath the handle is greatly reduced if not entirely overcome.

There is a special purpose in rounding the ends 4 of the end gate 5. It will be readily understood that were the ends square there would be a certain amount of cutting and scarring of the surfaces of the cleats. The rounded ends facilitate sliding the end gate in position and so prevent binding against the cleats.

The end gate may be adjusted to various heights in the cleats 3 by simply loosening the clamp screws, elevating the end gate to the desired position and again tightening the clamp screws. This feature is taken advantage of more particularly in unloading grain. The grain is shoveled from beneath the end gate, and by adjusting it to various heights, access to the grain is had as may be desired. The horizontal portion 3ª of the cleat 3 on the inside of the wagon body, forms a close joint between the cleat and the end gate. Grain is prevented from lodging in this joint by the closeness of it.

The advantage of binding the rear ends of the sides 2 by the metallic sheath 1 has been referred to. It often occurs in instances where the wooden ends of the sides are exposed without metallic reinforcement, that portions of the sides will be broken off in moving the wagon about. By carrying the sheath 1 around the end of the side the possibility of breaking or splitting the ends is overcome altogether. The provision of the sheath 1 also prevents the horses from gnawing the exposed ends of the sides.

While the construction and arrangement of the device is that of a generally preferred form, obviously modifications and changes may be made without departing from the spirit of the invention or the scope of the claims.

I claim:—

1. In a device as described, the combination with the sides of a wagon, each side having a shallow vertical groove, of a sheath for the end of each side, each sheath including a semi-circular cleat occupying the adjacent groove, a securing member for holding each cleat in the groove, an end gate adapted to be set in position between the cleats, hook devices at the ends of the end gate, a clamp device journaled in each wagon side near each cleat, each clamp device being arranged to engage the companion hook device and upon operation thereof, to draw the end of the end gate into the adjacent cleat, the engagement of the cleat with the groove and the associated securing member, preventing the cleat from being displaced under pressure, and a brace rod reaching from one hook device to the other, with portions partly embracing the hook devices to strengthen said devices at the points of engagement of the clamp devices.

2. In a device as described, the combination with the end of a wagon side having a shallow vertical depression, of a thin metallic member secured to said side and sheathing the end, including a semi-circularly bent cleat seating in the depression, an end gate adapted to be set into the cleat, associated clamping devices mutually carried by the end gate and the wagon side, arranged upon operation to force the end of the end gate into the cleat, and a securing member holding the cleat to its seat in the depression, said securing member and the engagement of the cleat with the depression, preventing the thin metallic member from becoming distorted upon operation of said clamping devices.

3. In a device as described, an end gate having a rounded end, a hook plate secured to said gate, and terminating in a hook adjacent to the rounded end, a semi-circular metallic cleat arranged to receive the rounded end of said gate and including parallel portions, one of said portions being adapted to enter the recess between the adjacent surfaces of the hook and the end gate, and clamping means arranged to engage the hook, force the rounded end of the end gate into the semi-circular cleat and wedge the aforesaid parallel portion into said recess.

4. In a device as described, an end gate, having a rounded end, a hook plate including a hook located adjacent to said rounded end and provided with a recess, a combined sheath and cleat arranged to be secured on the end of a wagon side, the cleat including a semi-circular guide receiving the rounded end of the end gate, a bushing secured in said sheath and wagon side, a nut revoluble in said bushing and including means preventing longitudinal motion thereof, means for turning the nut, a clamp screw threaded in the nut and including a shank receivable by said recess, and a clamp head carried by said screw engaging said hook.

5. In a device as described, the combination of a hook on the hook plate, a rotatable nut held from longitudinal movement, a clamp screw threaded in said nut, a clamp head carried by said screw having a beveled edge for riding over the edge of the hook when the clamp head is moved into locking position, and a lug mounted on the head whereby the clamp head and nut are turned.

6. In a device as described, the combination with the hook having a recess on the edge, a clamp screw, including a shank receivable in said recess, a clamp head engageable with said hook and having beveled edges adapted to ride over the edge of the hook in moving said head to the locking or unlocking position and a lug formed on the head for rotating the head.

7. In a device as described, the combination with a wagon side having a shallow vertical groove, a metallic sheath binding the end of the wagon side to prevent breaking and splitting, a semi-circular cleat included in said sheath adapted to occupy said groove, and means passing through the wagon side from the semi-circular cleat to the adjacent sheath portion, to bind said semi-circular cleat in said groove and preventing it from springing out.

8. In a device as described, the combination with the wagon sides, metallic sheath members arranged to be secured on the ends of the sides, semi-circular cleats included in said sheaths, an end gate having unsheathed rounded ends receivable by said cleats without binding, hook plates including hooks at the extremities of the end gate, a combined end gate rod and brace extending between the plates and including portions engaging and bracing the hooks, a bushing mounted in each sheath, a revoluble nut in each bushing, a handle for turning the nut, and clamping means including a threaded shank received by the nut and a clamp head engaging the adjacent hook.

9. In a device as described, the combination with a wagon side having a sheathed end, of a bushing fixed in the sheathed end, and having an annular collar exposed on the outside, a revoluble nut mounted in the bushing, said nut having a head bearing on said collar, and a handle carried by said head, the end of said handle being rounded and turned close to the wagon side sheath to prevent catching the clothing on the end of the handle.

10. In a device as described, the combination with the sides of a wagon, of an end gate adapted to be fitted across the back of the wagon between the sides, hook plates on the end gate, having hooks equal in height to that of the end gate, and clamping devices carried by the wagon sides and adapted to clamp said hooks at any point, to support the end gate at different heights.

LEVI P. WELLS.

Copies of this patent may be obtained for five cents each, by addressing the "Commissioner of Patents, Washington, D. C."